United States Patent
Winter et al.

(10) Patent No.: US 6,473,691 B1
(45) Date of Patent: Oct. 29, 2002

(54) METHOD FOR OPERATING A NAVIGATION SYSTEM

(75) Inventors: Stephan Winter, Hannover (DE); Thomas Jung, Frankfurt (DE); Bernd Hessing, Holle (DE); Walter Nordsiek, Hildesheim (DE); Olaf Binnewies, Hildesheim (DE); Thomas Fabian, Hildesheim (DE); Bettina Rentel, Giesen (DE); Dirk Otte, Laatzen (DE); Dirk Tiemann, Hannover (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 09/914,368
(22) PCT Filed: Nov. 4, 2000
(86) PCT No.: PCT/DE00/03878
§ 371 (c)(1),
(2), (4) Date: Mar. 11, 2002
(87) PCT Pub. No.: WO01/50089
PCT Pub. Date: Jul. 12, 2001

(30) Foreign Application Priority Data

Dec. 30, 1999 (DE) .......................... 199 63 766

(51) Int. Cl.⁷ ............................................. G01C 21/32
(52) U.S. Cl. ...................... 701/208; 701/209; 707/100
(58) Field of Search ................................ 701/208, 209, 701/200, 201; 707/100

(56) References Cited

U.S. PATENT DOCUMENTS

| | | | |
|---|---|---|---|
| 5,953,722 A | | 9/1999 | Ashby ........................ 707/100 |
| 5,968,109 A | * | 10/1999 | Israni et al. ................. 701/208 |
| 6,415,227 B1 | * | 7/2002 | Lin ............................. 701/213 |

FOREIGN PATENT DOCUMENTS

| EP | 0 838 663 A | 4/1998 |
|---|---|---|
| EP | 0 945 706 A | 9/1999 |
| WO | 99/58934 A | 11/1999 |

* cited by examiner

Primary Examiner—William A. Cuchlinski, Jr.
Assistant Examiner—Marthe Y. Marc-Coleman
(74) Attorney, Agent, or Firm—Michael J. Striker

(57) ABSTRACT

The invention relates to a method for operating a navigation system comprising a digital map base, which is a representation of actual geographical areas and which contains data of geographical elements. The navigation-system also comprises a unit, which retrieves and processes the data, such as an operating unit provided with a display device. The data in the digital map base is combined in the form of geographically defined page frames. When requesting a page frame from the digital map base, data of geographical elements which extend beyond the edge of the page frame is transferred in such a manner that data pertaining to these geographical elements located outside of the requested page frame is also compiled and transferred.

5 Claims, 1 Drawing Sheet

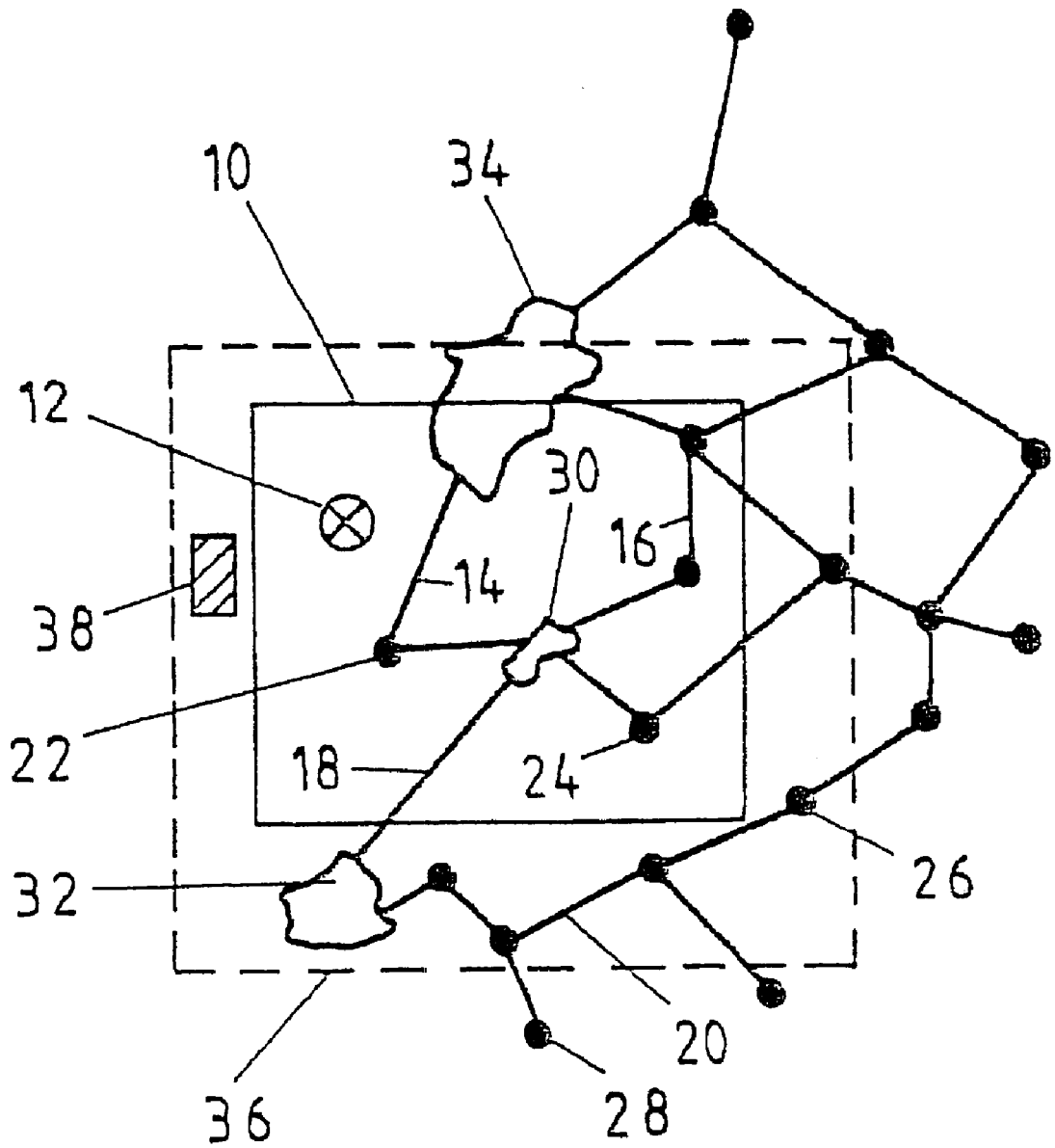

METHOD FOR OPERATING A NAVIGATION SYSTEM

FIELD OF THE INVENTION

The present invention relates to a method for operating a navigation system, having a digital map base which includes a reproduction of actual geographic regions and data of geographic elements, as well as having a device, such as a control panel with a display device that calls up the data and processes them, the data being summarized in the digital map base in the form of geographically defined tiles, as generically defined by the preamble to claim 1.

PRIOR ART

In means of locomotion, such as motor vehicles, aircraft or ships, permanently installed navigation systems rapidly, simply and securely guide an operator of the means of locomotion toward a desired destination, without having to plan a route in advance at great effort and without having to obtain and study map material accordingly beforehand. To that end, navigation data are stored as a digital map base in the navigation system, for instance on CD-ROM, and based for instance on maps, regional maps or road maps. The navigation device for instance uses the GPS (Global Positioning System) in order to ascertain the location at that moment and calculate appropriate navigation directions that lead to a predetermined destination. The navigation data for instance contain data about streets and roads for motor vehicles as well as more extensive geographic information, such as mountains, lakes, forests, developed regions, or other topographical elements, or extensive information, such as restaurants, hotels, sights to see, or other information.

The digital map base is essentially a reproduction of the actual road network and the corresponding geographic environment. This information from the digital map base is displayed on a control panel on a display for the sake of informing the driver; for the sake of simplicity of illustration, the degree of detail or number of geographic characteristics displayed can be selected differently for different situations. For instance on an overview map, only limited access highways are shown, while a map of the inner city should include details down to the extent of residential buildings. This choice of the map details displayed has quite a substantial influence on the clarity and legibility of maps displayed on the basis of the digital map base; this is especially important for displays in vehicles, since a driver should be able at a glance to see all the necessary information to follow a given route. Logically, the map displays cannot all be produced by the same generally defined rules; relative weighting of the display elements must be done instead. For instance, an overview map of the Ruhr in Germany ought not to show all the autobahns. By comparison, a map on the same scale in Arizona could show even very minor roads.

In navigation systems for motor vehicles, it is appropriate for the navigation module, which makes the digital map base available, to be separated from the devices that display it, and these should also be developed separately from one another. A predefined interface is then necessary, for access to the digital map base of the navigation module. This interface must make it possible, in the display device, to produce digital maps with good clarity on different scales.

Such interfaces are known, produced for instance by the companies known as NAVTECH (http://www.navtech.com) or Etak Inc. (http://www.etak.com). These interfaces enable access to the physical memory format of the digital map base. In different vehicles, however, different digital map bases are used. Furthermore, on access by means of the navigation module, for instance for internal route calculation, and control panel computers, for instance for generating a display of a detail of the digital map base on the display device, access conflicts can occur. Also, the elements in the digital map bases are described "directly"; that is, an autobahn is a road of the motorway or limited access highway class, with a number. It has been found that standardization and unification of the classification of map elements is possible only on a very unsatisfactory level that cannot be used to generate a display.

Furnishing the data for display on the display device on the control panel of a navigation system is often done in the form of geographically defined tiles. A tile network is formed by dividing up the surface of the Earth for the map into a network of tiles of the same geographical area, comparable to the grid squares on a conventional printed map. Each grid square is equivalent to one tile. The control panel calls up a tile and shows it on the display device. The information contained in the tile is also used for calculating a route. This has the advantage on the one hand of achieving simple definition of the data to be requested from the digital map base, because a tile is simply called up, and all the data contained in this tile regarding geographic elements are transmitted. In addition, decoupling between the screen portion and data maintenance is also achieved. On the other hand, it is a major disadvantage of tiles that data or information that may be of interest are located outside that particular tile or are unavailable at the edge of the tile, because they have been cut off by so-called "clipping" and were not also transmitted. Data on the edges of tiles may also require calculation for the sake of route calculation. Rounding errors then occur, if for instance a line originating at a starting point is rounded off by "rounding down" to a coordinate located on the edge of the tile. In the neighboring tile, the coordinate located on the edge of the tile and calculated from the end point of the line can be rounded by "rounding up" to some other coordinate. The tile coordinates of the line are then not located on one another at the edge of the tile. Hence this method for determining the tile edge coordinates (called clipping) is complicated and vulnerable to error.

SUMMARY OF THE INVENTION, OBJECT, ATTAINMENT OF THE OBJECT, AND ADVANTAGES

It is the object of the present invention to make an improved method of the above type available which overcomes the aforementioned disadvantages and achieves a more-flexible display that is closer to reality.

This object is attained by a method of the type defined above having the characteristics defined by the body of claim 1.

To that end, the invention provides that when a tile is requested from the digital database, data of geographic elements which have an area beyond past the edge of the tile are transmitted in such a way that data pertaining to these geographic elements are also collected and transmitted outside the requested tile.

This has the advantage that on the one hand the device that calls up the data need not itself know the size of the tile, and a tile can merely be called up by indicating a pair of coordinates, and on the other hand, data pertaining to geographic elements that overlap the edge of the tile can also be present, adjacent to the edge of the tile, outside the tile. "Clipping" at the boundaries of tiles is unnecessary. In addition, a "map", regardless of the size of the tile, can be assembled for display on the display device, so that tile boundaries need not necessarily be visible in the display. In addition, lapses in the map display that are otherwise caused by rounding errors in "clipping" algorithms at the tile boundaries are avoided.

Advantageous refinements of the method are described in dependent claims 2–5.

For instance, when a tile is requested, data of geographic elements which while located outside the requested tile are nevertheless adjacent to the edge of the requested tile within a predetermined region are additionally transmitted.

A tile request without knowledge of the internal coordinate format of the digital tile and without knowledge of the size of the tile is attained in that the request of a tile is parametrized via geographical coordinates.

If certain data elements, such as hotels, railroad lines, restaurants or the like, are known in the device that calls up and processes the data, then expediently a request of a tile is done by inclusion and/or exclusion of such data elements contained in the tile.

In a preferred embodiment, when a tile is requested from the digital database, data on the requested tile are additionally transmitted that include indications of the size of the tile, area of the tile, maximum area with adjacent and protruding geographic elements, data elements contained in the tile, and/or other information describing the tile. Because data elements contained in the tile are additionally transmitted, the device that requests and processes the data can optimize subsequent requests for data such that not all the data elements contained in the tile may optionally be transmitted, and instead individual groups of data elements, such as streets, roads, hotels, railroad lines, restaurants or the like are excluded when the tile is requested.

BRIEF DESCRIPTION OF THE DRAWINGS

The invention will be described in further detail below in conjunction with the accompanying drawing. The sole FIGURE of the drawing shows a division of navigation data into geographic tiles.

BEST MODE FOR EMBODYING THE INVENTION

In the division, shown in the sole drawing FIGURE, of a digital map base into various tiles, only one tile 10 is explicitly shown. Additional tiles adjoin this tile 10 at the top, bottom, right and left accordingly. When navigation data are called up from the digital map base within a navigation system, only one coordinate 12 is transmitted. In the device that manages the digital map base, this coordinate is assigned to the tile 10, within which this coordinate point is located. All the data of geographic elements are thereupon collected together and transmitted to the calling device, such as a control panel with a display device. These data pertain to or describe geographic elements, such as streets and roads 14, 16, 18, 20, junctions 22, 24, 26, 28 or urban areas 30, 32, 34. Here the roads 14, 16, junctions 22, 24 and the urban area 30 are located entirely inside the tile 10, while the road 18 and the urban area 34 overlap the tile boundary.

According to the invention, all the data of geographic elements that overlap the tile boundary are additionally collected and transmitted, so that from these geographic elements, data outside the tile 10 are also available in the device that calls up the data. This pertains for instance to the road 18 and the urban area 34.

In addition, data from such geographic elements are optionally also collected and transmitted that are neither located inside the tile 10 nor overlap the edge of the tile, but are located within a certain region 36 adjacent to the tile 10. In the sole drawing FIGURE, this applies to the road 20, junction 26, urban area 32, and a forest 38.

The request for the data is accordingly done in units of tiles by way of geographical coordinates. The tiles are processed without "clipping"; that is, portions of the data can be located outside the edges of the tiles. On the basis of a tile request, all the data contents, even if located only partly within the tile boundaries, are searched for together and reported. The geographic elements that overlap a tile boundary are also contained in the various neighboring tiles. The device that uses the tile data and the device that furnishes the data are decoupled from one another as well as possible.

As a result, it is simple to determine the required data contents from the geographical definition of the tiles.

To that end, conventional coordinate systems (WGS84) are used. This makes the access method independent of the physical data format, and in particular independent of the encoding method for geographical coordinates on data media.

For access to one tile, only one pair of coordinates 12 is necessary. The requesting device need not know the size of the tile before the initial access. This enables a simple calculation in the data server of the map elements located in one tile. There is no need for "clipping" at the tile boundaries. By identity of the geographic elements contained in adjacent tiles, a "map" can be assembled there from individual tiles 10 that is independent of the tile size. Tile boundaries are not necessarily apparent in this map. Lapses in the map display that are otherwise caused by rounding errors in clipping algorithms cannot occur. The interface can also be employed between the navigation system and a data server headquartered outside the vehicle (air interface, telematics). When the possible content of the tile is known to the requesting device, an example being roads, rivers and railroad lines, then the device can name the data contents to be included and excluded when it makes the request, for instance calling up only roads and excluding all the railroads.

The contents located within one tile can be announced in the response. As a result, the requesting device can better configure the next request for tiles, for instance by means of suitable inclusions or exclusions.

The area of a tile can be imparted in the response as well, the typical area, the maximum area, that is, with protruding map contents. The next request can thus the next request, for instance for the neighboring tiles, can be configured.

What is claimed is:

1. A method for operating a navigation system, having a digital map base which includes a reproduction of actual geographic regions and data of geographic elements, as well as having a device, such as a control panel with a display device that calls up the data and processes them, the data being summarized in the digital map base in the form of geographically defined tiles, characterized in that when a tile is requested from the digital database, data of geographic elements which have an extension past the edge of the tile are transmitted in such a way that data pertaining to these geographic elements are also collected and transmitted outside the requested tile.

2. The method of claim 1, characterized in that when a tile is requested, data of geographic elements which while located outside the requested tile are nevertheless adjacent to the edge of the requested tile within a predetermined region are additionally transmitted.

3. The method of claim 1, characterized in that the request of a tile is parametrized via geographical coordinates.

4. The method of claim 1, characterized in that the request of a tile is parametrized by inclusion and/or exclusion of data elements contained in the tile, such as streets, roads, hotels, railroad lines, restaurants, or the like.

5. The method of claim 1, characterized in that when a tile is requested from the digital database, data on the requested tile are additionally transmitted that include indications of the size of the tile, area of the tile, maximum area with adjacent and protruding geographic elements, data elements contained in the tile, and/or other information describing the tile.

* * * * *